United States Patent [19]

Dabi et al.

[11] 4,335,029
[45] Jun. 15, 1982

[54] AQUEOUS POLYURETHANE COMPOSITIONS

[75] Inventors: Shmuel Dabi, Fair Lawn; Peter Loewrigkeit, Wyckoff; Kenneth A. Van Dyk, Stockholm, all of N.J.

[73] Assignee: Witco Chemical Corporation, New York, N.Y.

[21] Appl. No.: 216,721

[22] Filed: Dec. 15, 1980

[51] Int. Cl.³ ............................................. C08L 75/06
[52] U.S. Cl. .................................................. 524/589
[58] Field of Search ................... 260/29.2 TN, 29.4 R; 525/440

[56] References Cited

U.S. PATENT DOCUMENTS

| | | | |
|---|---|---|---|
| 3,756,992 | 9/1973 | Dieterich | 260/29.2 TN |
| 4,046,729 | 9/1977 | Scriven et al. | 260/29.2 TN |
| 4,147,679 | 4/1979 | Scriven et al. | 260/29.2 |
| 4,203,883 | 5/1980 | Hangauer, Jr. | 260/29.2 |

*Primary Examiner*—Theodore E. Pertilla
*Attorney, Agent, or Firm*—Albert L. Gazzola; Morton Friedman

[57] ABSTRACT

A stable aqueous dispersion latex of a room temperature curing polyurethane forming films resistant to water and organic solvents is disclosed, the polyurethane containing units derived from melamine, in addition to units derived from diisocyanate and difunctional reactants, in the polymer chain, pendant water-dispersing carboxylic salt groups, and room temperature curable and crosslinking N-methylol hydrazide termini, and methods for making such dispersion.

18 Claims, No Drawings

AQUEOUS POLYURETHANE COMPOSITIONS

BACKGROUND AND DISCUSSION OF PRIOR ART

This invention relates to aqueous polyurethane compositions and more particularly to aqueous dispersions of room temperature curing polyurethane effective for depositing water resistant and organic solvent resistant films on any suitable substrate.

Polyurethanes have found widespread use in coatings for fabrics, plastics, wood, metal, and the like, due to their advantageous properties such as their good chemical resistance, abrasion-resistance, toughness, elasticity and durability, and their ability to cure rapidly. Conventionally, such coatings have been applied as solutions in, for instance, polar or aromatic hydrocarbon solvents. When the polyurethanes are of certain types, they may be compatible with aliphatic hydrocarbon solvents. When the coating is being dried, or cured, these solvents vaporize into the atmosphere as an economic loss and, quite importantly, the vaporous solvents may pollute the atmosphere.

Aqueous polyurethane coating compositions are, therefore, particularly desirable due to the low cost and availability of water. Moreover, aqueous coating compositions are advantageous since the evaporation of water into the atmosphere has little, if any, adverse effect on the environment, whereas conventionally employed organic solvents may be toxic, odoriferous, or photochemically-sensitive, and thus, may be smog-formers in the daylight atmosphere due to photochemical oxidation. Furthermore, water which is readily available can be used to thin the water-based coating compositions and can be used in clean-up operations. However, polyurethanes generally are not compatible with water unless special ingredients and/or particular steps of manufacture are employed in their synthesis.

One approach to provide water-dispersible, polyurethane-containing compositions has been through the use of emulsifiers. This procedure generally suffers from the disadvantages that the dispersions are relatively unstable and the resultant films are water-sensitive.

It has also been previously proposed to render polyurethanes dispersible in water by providing the polymer chain with pendant acid salt groups. Films produced with latices containing such polymers have not been found to be entirely satisfactory with respect to sufficient hardening, curing and/or cross-linking under ambient (e.g., room temperature) conditions, resistance to both water and organic solvents, elongation, flexibility, tensile strength, and/or impact resistance and the like.

It is accordingly an object of this invention to provide aqueous polyurethane compositions and dispersions, and methods for making same, which will not be subject to one or more of the above deficiencies or disadvantages. Other objects and advantages will appear as the description proceeds.

The attainment of the above objects is made possible by this invention which includes the provision of an aqueous dispersion of a room temperature curing polyurethane forming films resistant to water and organic solvents, prepared by:

a. Dispersing in water an NCO-terminated polyurethane prepolymer containing units derived from melamine in the prepolymer chain and pendant water-dispersing carboxylic salt groups, b. chain extending the dispersed prepolymer by mixing into the dispersion an aliphatic polyamine chain extender more reactive with NCO groups than water, c. end capping the resulting dispersed polyurethane by mixing into the dispersion an organic dihydrazide, and d. reacting the resulting dispersed end capped polyurethane by mixing formaldehyde into the dispersion to convert hydrazide end caps into N-methylol groups; the resultant N-methylol terminated polyurethane containing about 1% to about 5% by weight of units derived from melamine.

In the above-defined dispersions of this invention, the components peculiarly coact and cooperate to achieve the desired improved and unexpected results. The melamine performs a major role in providing improved resistance to organic solvents, in conjunction with the organic dihydrazide end caps and, preferably, diethylenetriamine chain extender. The methylol termini produced by reaction of the hydrazide end caps with formaldehyde undergo self condensation under ambient conditions upon drying of the latex film on the substrate. This cross linking in the dry state avoids the need for an external cross linker.

NCO-terminated polyurethane prepolymers are notoriously produced by reacting organic material containing an average of about 2 hydrogen atoms per molecule, preferably a polyester polyol as in the present invention, with a stoichiometric excess of an organic diisocyanate. It is also known to include in the reaction medium a dihydroxyalkanoic acid which contributes randomly to the polymer backbone and provides pendant water dispersing carboxylic acid salt groups.

According to a preferred embodiment of this invention, the NCO-terminated prepolymer is produced by sequentially reacting the dihydroxyalkanoic acid, preferably at a lower temperature, with the intermediate resulting from the previous reaction of the organic diisocyanate with melamine and the organic material containing an average of 2 active hydrogen atoms per molecule (e.g. polyester polyol). This procedure has been found to reduce or eliminate undesired reaction of the COOH group in the dihydroxyalkanoic acid, needed to provide the desired pendant water dispersing carboxylic salt groups, with other reactant components of said intermediate. This sequential procedure also yields a polymer chain with a partial block structure significantly different from the prior art random structure, apart from the further distinction of containing units derived from melamine in the random structure of the intermediate.

U.S. Pat. No. 4,147,679 issued Apr. 3, 1979, to R. L. Scriven and U.S. Pat. No. 4,203,883 issued May 20, 1980, to D. G. Hangauer, Jr. disclose aqueous dispersions of polyurethanes containing pendant water dispersing carboxylic salt groups, but neither discloses melamine containing polymer, N-methylol termini, the above described sequential reaction, or the resulting polymer structure.

The organic diisocyanates useful in preparing the instant polyurethanes comprise substantially all those known and disclosed in the prior art. They may be aliphatic, aromatic, cycloaliphatic, heterocyclic, or any mixture thereof, and may contain any substituent noninterfering groups e.g., containing substantially nonreactive hydrogens as determined by the Zerewitinoff test, J. Am. Chem. Soc., 49, 3181 (1927). The term "diisocyanate" as employed herein and in the appended claims is inclusive of compounds and adducts containing thioisocyanate and/or isocyanate groups. Representative diisocyanates useful herein are disclosed in column 6 of U.S. Pat. No. 4,147,679, which disclosure is incorporated herein by reference thereto. Preferred for use herein is 4,4'-bis(isocyanatocyclohexyl)methane, otherwise referred to as 4,4'-methylene-bis(cyclohexylisocyanate).

The organic material containing an average of 2 active hydrogen atoms per molecule useful for reaction with the diisocyanate herein also comprises substantially all those known and disclosed in the prior art. The material may be aliphatic, aromatic, cycloaliphatic, heterocyclic, or any mixture thereof. The term "active hydrogen atom" refers to hydrogens which, because of their position in the molecule, display activity according to the Zerewitinoff test. Accordingly, the term includes hydrogens attached to O, S or N, and thus useful such material will include those monomers, oligomers and polymers containing any 2 of the groups —OH, —SH, —NH—, and —NH$_2$. Polyols (e.g. dihydroxy) are preferred because they react so readily with NCO groups, give higher yields of hydrolytically stable urethane with minimal by-products, and are readily available in a wide variety of forms. Polyether polyols, and especially polyester polyols, are preferred, generally those having molecular weight (M.W.) ranging from about 400 to 5000, preferably about 1,000 to about 2,000.

The polyether polyols include polyalkylene ether glycols such as polyethylene glycols, polypropylene glycols, polyoxyethylenated polypropylene glycols, polyoxyalkylated higher diols such as hexanediol and Bisphenol A, polyhydric polythioethers and the like.

The polyester polyols are generally prepared by polyesterification reactions between organic diols and organic dicarboxylic acids. Especially preferred for use herein is the OH-terminated polyester polyol having a molecular weight of about 1,000 to 2,000 produced by reacting adipic acid with a stoichiometric excess of a mixture of hexanediol and neopentyl glycol.

It will be understood that a portion of the material containing an average of about 2 active hydrogen atoms may contain only 1 active hydrogen, which deficiency would be corrected by inclusion of a complementary portion of material containing 3 or more active hydrogens, provided however that proportions materially greater than such complementary portion tend to yield undue and premature cross-linking, viscosity increases, and the like and should hence be avoided.

Representative materials containing an average of about 2 active hydrogen atoms which are useful herein, including the preferred polyester polyols, are disclosed in the passage in U.S. Pat. No. 4,147,679 from column 7, line 1 to column 11, line 40, which passage is incorporated herein by reference thereto.

As indicated above, melamine is included in the reaction medium in an amount sufficient to provide the final N-methylol terminated polyurethane with about 1% to about 5%, preferably about 2% to about 3.5%, by weight of units derived from the melamine in the polymer backbone chain along with units derived from the diisocyanate, from the carboxyl-providing reactant, and from the different, additional material, reactive with NCO, containing an average of 2 active hydrogen atoms per molecule.

The insertion of pendant water dispersing carboxylic acid salt groups, in proportions of about 0.5% to about 10% by weight of the final hydroxymethylamino-terminated polymer, may be accomplished by use, for reaction with the diisocyanate, of a suitable portion of the organic material containing, in addition to the required average of about 2 active hydrogen atoms, at least one comparatively unreactive carboxylic group in salt form, or preferably in free acid form which is subsequently neutralized to salt form after the prepolymer formation. Carboxylic insertion by use of a carboxyl-substituted diisocyanate is impractical because such compounds are unstable. It is preferred to employ as a reactant for this purpose an alpha,alpha-dimethylol C$_{2-10}$ alkanoic acid such as 2,2-dimethylol butyric, pentanoic, octanoic and/or decanoic acids, preferably 2,2-dimethylol propionic acid, or any mixtures thereof.

The above-discussed carboxyl-providing reactant may be included in the initial reaction medium containing the organic diisocyanate reactant resulting in random inclusion of pendant carboxyl groups along the polymer chain, as disclosed in the prior art. The carboxyl-providing reactant may be in free acid form calling for subsequent neutralization to water dispersing salt form at or prior to the time of dispersion in water, or the reactant may be already neutralized when employed in the copolymerization reaction.

According to a preferred embodiment of this invention as described above, the organic diisocyanate, melamine, and noncarboxyl-providing material containing an average of 2 active hydrogen atoms per molecule are first reacted to form an NCO terminated intermediate which is then reacted with the carboxyl-providing reactant, preferably in free acid form suitable for subsequent neutralization after the prepolymer formation. This sequential reaction also permits reaction of the carboxyl-providing reactant with said intermediate at relatively lower temperatures of about 50° to about 80° C. The previous reaction to form the intermediate is generally conducted, like the prior art reaction for producing NCO-terminated polyurethane prepolymers, at temperatures of about 100° to below about 150° C., at which temperature discoloration tends to appear. The intermediate generally contains about 8% to about 12% by weight of NCO, and the NCO-terminated prepolymer, after reaction with the carboxyl-providing reactant, e.g., 2,2-dimethylol propionic acid, generally contains about 0.5% to about 7%, usually about 2.5% to about 4.5%, by weight of NCO.

The NCO-containing polymer (prepolymer) can be prepared by techniques well known in the art. For example, the polyisocyanate is usually first charged to a suitable reaction vessel, followed by the active hydrogen component, and the mixture may then be heated if necessary until isocyanate has completely reacted with the active hydrogens to produce an NCO-containing prepolymer being essentially free of active hydrogens as determined by the product having an essentially constant NCO equivalent. If desired, catalyst such as dibutyltin dilaurate, stannous octoate and the like can be employed to accelerate the reaction. Reaction can take from several minutes to several days, depending on the reactivity of the reactants, temperature, presence or absence of catalyst, and the like.

The urethane prepolymers can be prepared in the presence of a solvent which is essentially inert to the reaction. The solvents are generally organic and may be comprised essentially of carbon and hydrogen with or without other elements such as oxygen or nitrogen. While it may not be necessary to employ a solvent during formation of the urethane prepolymer, the use of a solvent may be desirable to maintain the reactants in the liquid state as well as permit better temperature control during the reaction by serving as a heat sink and, if desired, as a refluxing medium. The solvent employed should not contain active hydrogen as determined by the Zerewitinoff test. Solvents which may be employed include dimethylformamide, esters, ethers, ketoesters, ketones, e.g., methyl ethyl ketone and acetone, glycol-ether-esters, e.g., N-methyl pyrrolidone, hydrogenated furans, and the like, and mixtures thereof. The amount of solvent employed should be sufficient to provide a prepolymer solution having a sufficiently low viscosity to enhance the formation of the polyurethane dispersion of this invention. However, the solutions may be successfully employed in forming the dispersions even though the viscosity of the solution is relatively high at the temperature of dispersion. Such viscosities may be well above 10,000 centipoises, e.g., be at least about 12,000 or 15,000 centipoises, and only mild agitation need be employed to form the dispersion, even in the absence of an emulsifying agent. Often about 0.1 to 10 parts by weight of solvent, preferably about 0.5 to 2 parts by weight of solvent, per part by weight of the prepolymer can be used. The presence of a solvent for the polyurethane, however, is not necessary to provide a stable, infinitely dilutable aqueous dispersion. Often, when solvent is employed during the preparation of the urethane prepolymer and/or the polyurethane polymer it is desirable to remove at least a portion of the solvent from the aqueous dispersion of polymer. Advantageously, the solvent to be removed from the dispersion has a lower boiling point than water and thus can be removed from the dispersion by, for example, distillation. The removal of the low boiling solvent is desirably conducted under conditions which are not deleterious to the urethane polymer such as vacuum distillation or thin film evaporation conditions. A solvent having a higher boiling point than water such as dimethyl formamide, N-methyl-pyrrolidone, and the like, which is a solvent for the urethane polymer may be employed, in which case, the higher boiling solvent is generally retained in the aqueous dispersion of urethane polymer to enhance the coalescence of the urethane polymer particles during film formation.

In general, it is preferred to employ herein a water soluble organic solvent boiling above about 145° C. (and therefore needing no special precautions in the polymerization reaction carried out at lower temperatures), N-methyl pyrrolidone being preferred. As indicated above, this solvent remains in the latex and final coating composition, enhancing coalescence of the deposited films. Usually, the solids content of the prepolymer in the organic solvent solution just prior to dispersion in water may range from about 30% to 80%, by weight.

The organic polyisocyanate is employed in an amount sufficient to react with the desired amount of the active hydrogen-containing components so as to produce an NCO-containing prepolymer. The equivalent ratio of organic polyisocyanate to active hydrogen-containing compound should be at least 4:3 and is usually within the range of about 7 to 1.5:1, preferably within the range of 6 to 1.8:1. To make a high molecular weight thermoplastic material, i.e., 10,000 or more, reaction should be complete so that substantially all the active hydrogen material is used up, and the resulting NCO-polymer is substantially free of highly active hydrogen. By the expression "substantially free of active hydrogen" is meant the resultant NCO-polymer is substantially free of active hydrogen associated with materials charged to the reaction mixture for the purpose of reacting with isocyanates to form urethanes, thiourethanes and ureas, that is, —OH, —SHNH, —NH$_2$. Not included within the expression highly active hydrogen are the urethane, thiourethane and urea hydrogens formed in the NCO-polymer forming reaction, or any hydrogens associated with salt formation (e.g., acid groups). The determination that the product is substantially free of highly active hydrogen is made when reaction is complete and the fully reacted product has an essentially constant NCO equivalent.

For high molecular weight thermoplastic prepolymers, the use of all low molecular weight active hydrogen-containing compounds is often undesirable if non-crystalline polymers are desired. Thus, some high molecular weight active hydrogen compound should be included in the prepolymer in order to make non-crystalline coatings. With low molecular weight prepolymers, such control on the active hydrogen-containing compound is not necessary.

For elastomeric coatings, a high molecular weight polyester or polyether polyol should be present in the prepolymer formulation and constitute at least 20 percent by weight of the prepolymer based on total weight of the prepolymer reactants. Preferably, about 25 to 80 percent by weight of the polymeric polyol should be employed in order to get optimum elastomeric properties.

Suitable salt forming agents for neutralizing the carboxylic acid groups include inorganic and organic bases such as sodium hydroxide, potassium hydroxide, and preferably tertiary amines, e.g., water soluble aliphatic tertiary amines of about 3 to 12 carbon atoms such as the trimethyl, triethyl, methyl diethyl, tripropyl, N,N-dimethylethanol and/or N-methyldiethanol amines and the like. Volatile amines such as triethylamine have the further advantage of decomposing or volatilizing during the drying or curing of the latex film deposit, whereby the dried hardened film is less sensitive to water. It should be noted that the carboxylic groups exert their water-dispersing function substantially only when neutralized in salt form with resultant pH of more than 7 up to about 9.5–10, and that too high a proportion of carboxylic acid salt groups in the polymer undesirably increases the water sensitivity of the resulting films. Accordingly, in the interest of efficiency and economy, it is preferred to neutralize substantially all (100%) of the pendant carboxylic acid groups in the prepolymer, although lower proportions down to about 40% may be neutralized, and to insert in the prepolymer reaction medium no more carboxyl-providing reactant than is needed to yield a final polyurethane latex containing by weight about 0.5% to about 10% of pendant carboxylic acid groups on the polymer chain.

Preferably, the neutralization step is carried out by adding the base, preferably tertiary amine such as triethylamine, to the organic solvent solution of NCO-terminated prepolymer containing the desired proportion of pendant carboxylic acid groups. In the practice of the preferred sequential reaction described above, it may in some instances be feasible to add the carboxyl-providing reactant, e.g., 2,2-dimethylol propionic acid, and the preferred tertiary amine, e.g., triethylamine, substantially simultaneously or in closely timed sequence (post-addition of the tertiary amine) to the organic solvent solution of NCO-terminated intermediate. Salt formation may be carried out at ambient or elevated temperatures, a range of about 60° to about 80° C. being preferred to expedite completion of the desired reaction.

The resulting neutralized NCO-terminated prepolymer, neat or in organic solvent solution as described above, is then mixed under high shear with water to produce an aqueous dispersion in which the remainder of the process, e.g., chain extension, end capping, hydroxymethylation, is performed.

The amount of aqueous medium employed in the formulations of the dispersions of the present invention is important. When too little amount of aqueous medium is employed, mixtures are obtained which are often too thick to handle easily while, on the other hand, dispersions which are too dilute are uneconomical to handle due to their excessive volume. In general, the aqueous medium will amount to 40 to 90 percent by weight, preferably about 60 to 80 percent by weight, based on total weight of the polymer and the aqueous medium. Water is a necessary ingredient of the aqueous medium, being present in an amount of at least 30 and preferably at least 85 percent by weight based on total weight of the aqueous medium with a cosolvent constituting any remainder of the medium.

The term "dispersion" as used within the context of the present invention, is a two-phase, aqueous polyurethane system in which the polyurethane is the dispersed phase. When thinned with water to form a one percent solids dispersion, the average particle size diameter is less than 10 and preferably less than 5, and most preferably 1 micron or less. The dispersions are generally only stable if the particle size does not exceed 5 microns. Small particle size dispersions are advantageous because they are non-sedimenting and have a high surface energy associated with them. This results in a strong driving force for coalescing and in coatings having surprisingly fast drying times. The term "dispersion" is also intended to cover homogenous aqueous solutions which appear optically clear.

It should be pointed out at this point in the specification that where the term "polyurethane" has been used in the specification and claims, it is intended to cover not only polycondensates of polyisocyanates and polyols, but also the condensates of polyisocyanates with any active hydrogen-containing material mentioned above. Thus, the term "polyurethane" is defined as any polymer containing two or more urethane groups and is also intended to cover polyureas and polythiourethanes.

The NCO-containing polymer can be dispersed in a number of ways. Preferably, the prepolymer, whether neat or as a solution, is added incrementally to the aqueous dispersing medium with agitation. Alternately, the aqueous dispersing medium can be added incrementally to the prepolymer with stirring. However, this latter method is less preferred because commonly upon initial addition of the dispersing medium, a high viscosity, grease-like material results. The main disadvantage associated with this grease-like viscosity is that it is very hard to stir in more water. Without efficient stirring there is a definite possibility of forming gel particles. By adding the prepolymer to water, this high initial viscosity is avoided, and undesired water extension reduced.

After the NCO-polymer has been prepared, additional solvent can be added just before dispersion or, for that matter, after the prepolymer has been dispersed in the aqueous medium so as to control the viscosity of the medium and the particle size of the dispersed phase or enhance film coalescence and overall coating properties. The solvents can be selected from those mentioned above. Use of low molecular weight hydrophilic solvents such as lower alkyl alcohols (stearically hindered so as not to react with NCO) will sometimes increase the viscosity of the final polymer product acting as a thickening agent. The use of hydrophobic solvents such as toluene, benzene and xylene will give coarser dispersions. A hydrophilic solvent can be added to the prepolymer at any time in the process, although the effect it renders on the viscosity may be different. A hydrophobic solvent should preferably be added to the prepolymer before dispersion.

As has been mentioned above, because of viscosity and dispersion stability considerations, it is preferred that the NCO-containing prepolymer be added to the aqueous medium.

Usually after the salt form of the prepolymer has been dispersed, a chain extender is added to the dispersion fairly quickly. The prepolymer reacts with water at a slow rate depending upon the reaction mixture. The time after the prepolymer has been added to water and before chain extender is added will determine how much of the water reacts with the prepolymer. The temperature of the dispersion will also have an effect in how much reaction occurs. Change in temperature and time will result in different products. In order to get reproducible results, the time, temperature and amount of chain extender should be rigidly controlled. The time and temperature is important to determine what type of final product is desired. Chain extenders build molecular weight of the dispersed prepolymer. The chain extender can be defined as an active hydrogen-containing compound having at least two hydrogens more reactive with the NCO groups than water. Examples of suitable classes of chain extenders are primary and secondary organic amines, preferably diamines, hydrazine, substituted hydrazines and hydrazine reaction products. The chain extenders are preferably water-soluble, although water-dispersible materials may be used. Water-soluble chain extenders are preferred, because if the prepolymer is only marginally dispersible, a water-soluble chain extender will enhance the water dispersibility of the final polymer product. Organic diamines are often the preferred chain extenders because they usually build the highest molecular weight without gelling the resin.

Examples of suitable well known chain extenders useful herein include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, 4,4'-methylenebis(2-chloroaniline), 3,3'-dichloro-4,4'-biphenyl diamine, 2,6-diaminopyridine, 4,4'-diamino diphenylmethane, and adducts of diethylene triamine with acrylate or its hydrolyzed products. Also materials such as hydrazine, substituted hydrazines such as, for example, dimethyl hydrazine, 1,6-hexamethylene-bis-hydrazine, carbodihydrazide, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Of the foregoing chain extenders, certain types are preferentially employed as combinations of chain extenders and end cappers. More particularly, the polyurethane products of this invention are preferably chain extended with triamine-containing polyamine, especially both triamine and diamine. Enough triamine should be present in the chain-extending polyamine to provide an average of substantially more than 2, e.g., at least about 2.2, amine nitrogen atoms having active hydrogen per molecule of polyamine reacted. Advantageously, the average active amine hydrogen functionality of free polyamine mixture ranges between about 2.2 to 2.8 amine nitrogen atoms having active hydrogen per molecule of polyamine, and preferably is about 2.3 or 2.4 to 2.6, e.g., about 2.5 active hydrogen containing amine nitrogen atoms per molecule of polyamine. The chain extending polyamine can include components which are essentially hydrocarbon polyamines having 2 or 3 amine groups providing reactive hydrogens in accordance with the Zerewitinoff test, e.g., primary and secondary amine groups, and having 1 to about 40 or more carbon atoms, preferably about 2 to 15 carbon atoms. Preferably, the polyamine components each have at least 2 primary amine groups. Both the diamine and triamine components of the polyamine may contain other substituents which do not have hydrogen atoms as reactive with isocyanate groups as the primary or secondary amine groups. The polyamine components may have, for instance, an aromatic, aliphatic or alicyclic structure. Among the useful components of the polyamine are ethylene diamine, propylene diamine, 1,4-butylene diamine, piperazine, 1,4-cyclohexyldimethylamine, hexamethylene diamine, trimethylhexamethylene diamine, menthane diamine, 4,4'-diaminodicyclohexylmethane, diethylenetriamine, dipropylenetriamine, dibutylene triamine, and the carboxylic dihydrazides referred to above, all of which contain 2 terminal primary amino groups.

The chain extension can be conducted at elevated, reduced or ambient temperatures. Convenient temperatures are from about 5° to 95° C. or more, preferably from about 10° to about 45° C. Elevated or reduced pressures may be employed, however, the chain extension reaction is normally conducted at approximately ambient pressure. Generally, it is desired to continue the reaction until a good yield of the desired urea-urethane polymer is obtained. Preferably, the polyamine(s) employed in the method of this invention reacts rapidly with the urethane prepolymer such that undue reaction of water with the isocyanate groups is avoided.

The polyamine may be gradually added to the reaction medium which contains the urethane prepolymer in order to prevent the occurrence of localized high concentrations of the added reactant which may lead to forming urea-urethanes having an unduly broad molecular weight range. When employing high concentrations of the reactants in the reaction medium it is preferred that the combination of the polyamine and prepolymer be less rapid than when the reactants are less concentrated. For instance, when the reactants are in relatively low concentration in the reaction medium and the medium is well agitated, the polyamine and prepolymer can be quickly combined. Frequently, the rate of addition of the polyamine will be over a period of about 0.5 to 30 minutes. The rate of addition of the polyamine may, in part, depend upon the degree of agitation of the reaction medium and the speed with which the polyamine is dissipated in the reaction medium. The polyamine may be added in essentially undiluted form or in admixture with an organic solvent or with water. Preferably, the polyamine is in an essentially aqueous solution.

According to a preferred embodiment herein, initial chain extension is carried out by mixing into the aqueous dispersion of NCO-terminated prepolymer a solution in water of a mixture of about 40% to about 55% of ethylene diamine and about 15% to about 30% of diethylene triamine, the sum of said diamine and triamine in the mixture ranging from about 55% to about 80%, based on the weight of the free NCO in the prepolymer. After these polyamines have fully reacted to partially chain extend the prepolymer, usually requiring only a few minutes, adipic dihydrazide is added to the dispersion in an amount calculated to react with and chain extend the remaining free NCO in the prepolymer, i.e., about 45% to about 20% of the dihydrazide based on the free NCO in the prepolymer, and an excess amount of about 0.5 to about 3 parts dihydrazide per part of said calculated amount of dihydrazide for reacting with and end capping the termini of the fully chain extended prepolymer.

The resulting hydrazide end capped prepolymer is then partially or completely N-methylolated by adding to the dispersion for reaction with the —NH$_2$ of said end caps an amount of formaldehyde about 60% to about 120%, preferably at least 100%, of that needed to stoichiometrically react with and hydroxymethylate said —NH$_2$ in said end caps. The polyurethane is thus provided with internal cross linking, curable, hardening groups activated to self-condensation and cross-linking upon drying of the latex film on a substrate under ambient conditions.

Stated otherwise, the above proportions correspond roughly, in accordance with particularly preferred and exemplified embodiments of this invention, to about 1.2% to about 2.2% of ethylene diamine, about 0.6% to about 1.2% of diethylene triamine, about 3.4% to about 8.0% of adipic dihydrazide, and about 0.4% to about 1.3% of formaldehyde, based on the weight of the final N-methylol-terminated polyurethane.

The latex products of this invention are advantageously employed as coating compositions, for which purpose they may be further diluted with water and/or organic solvents, or they may be supplied in more concentrated form by evaporation of water and/or organic components of the liquid medium. As coating compositions they may be applied to any substrate including wood, metals, glass, cloth, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently.

These latices may also be used in non-coating applications such as in adhesive, cast thin or thick films, etc.

Coatings and films produced with these latices are curable under ambient conditions and have excellent resistance to water and organic solvents.

The following examples are only illustrative of preferred embodiments of this invention and are not to be considered limitative. All amounts and proportions referred to herein and in the appended claims are by weight and all temperatures are in °C., unless otherwise indicated.

EXAMPLES 1-3

Table I below shows the component parts of aqueous dispersions or latices illustrative of this invention. In each example, the latex is prepared as follows:

A. Prepolymer Preparation and Dispersion

In a 5,000 ml. resin kettle equipped with thermometer, stirrer, water condenser and vacuum outlet, melt the polyester polyol and dewater under water aspirator vacuum at 100° C. Release vacuum and at 110° C. add melamine and diisocyanate while stirring. Adjust temperature to 135°-140° C. and maintain for about 2.5-3 hours to complete the reaction resulting in an intermediate containing about 10.4%-10.7% NCO. At the beginning of the reaction the mixture is thin and white due to the dispersed melamine. As the reaction proceeds, the color changes to straw yellow and the viscosity increases.

Stir in an amount of N-methyl pyrrolidone about 4%-7% less than the weight of the polyester polyol, cool to 75°-80° C. add dimethylol propionic acid and stir at same temperature for about 2 hours.

Stir in stoichiometric amount of triethylamine (about ¾ the weight of the dimethylol propionic acid) and maintain till prepolymer has an NCO content of about 3.5%-3.8%.

Mix prepolymer/N-methyl pyrrolidone with an amount of water about 4.5 to 5 times the weight of the N-methyl pyrrolidone under high shear.

B, C Chain Extension and End Capping

Stir in mixture of ethylene diamine and diethylene triamine prediluted with water. After about 5 minutes, stir in adipic dihydrazide and maintain until substantially devoid of NCO.

D. Hydroxymethylation

Add formaldehyde (stoichiometric amount to methylolate hydrazide —$NH_2$ end groups) and stir for about 15 minutes.

TABLE I

| Polymer Solids (Free Acid Basis, Parts by Wt.) | | | |
|---|---|---|---|
| | Ex. 1 | Ex. 2 | Ex. 3 |
| Polyester Polyol* | 402 | 422 | 430 |
| Melamine | 32.7 | 31 | 29 |
| 2,2-Dimethylol Propionic Acid | 52.2 | 54 | 55 |
| Diisocyanate** | 411 | 417 | 411 |
| Diethylene Triamine | 5.6 | 10 | 10.7 |
| Ethylene Diamine | 13 | 15.7 | 20 |
| Adipic Dihydrazide | 72 | 50 | 38 |
| Formaldehyde | 10.4 | 7.4 | 6 |

*Reaction product of adipic acid with about 1% stoichiometric excess of 7/3 1,6-hexanediol/neopentyl glycol, M.W. ~1500.
**4,4'-bis(isocyanatocyclohexyl)methane.

Table II below shows proportions of chain extenders and end cappers, and properties of Examples 1-3 formulations. Latices are cast on acetone cleaned aluminum panels and dried at room temperature for 16 hours.

TABLE II

| | Ex. 1 | Ex. 2 | Ex. 3 |
|---|---|---|---|
| Diethylene Triamine %* | 15 | 25 | 25 |
| Ethylene Diamine %* | 40 | 45 | 55 |
| Adipic Dihydrazide %* Chain Extender | 15 | 10 | 5 |
| Adipic Dihydrazide %* End Capping | 30 | 20 | 15 |
| MEK (methyl ethyl ketone) Rubs | >100 | >100 | >100 |
| Tensile at Yield, psi | 5000 | 5400 | 4600 |
| Elongation % | 30 | 45 | 80 |
| Rocker Hardness | 50 | 44 | 42 |
| Latex pH at 25° C. | 9 | 7.7 | 7.8 |

*Percent of free NCO in prepolymer

Above latices also exhibit excellent water resistance. Example 1 product actually passed 200 MEK and 100 ethanol ribs in addition to 8 hours in a pressure cooker at 15 psi and 2 weeks in a humidity oven (70° C., 95% relative humidity) without significant change. The products of Example 2 and 3 have similarly excellent resistance properties.

EXAMPLES 4 AND 5

The procedure of Examples 1-3 is repeated with the following modifications:

A. The polyester polyol is melted at 80° C. and the diisocyante and ⅛ less melamine, and a small amount of Irgonox 1010 (Ciba-antioxidant to inhibit darkening), stirred in at 80°-90° C.

At this juncture ½ of the N-methyl pyrrolidone is stirred in and the reaction to form the intermediate carried out in N-methyl pyrrolidone at about 130° C. for about 2 hours yielding a clear solution of the intermediate free of unreacted insoluble melamine particles observed in the Examples 1-3 procedure. This procedure enables a reduction in the amount of charged melamine and lower reaction times, temperatures and durations. The reaction to form the intermediate is run until the theoretical ~8% NCO is attained which then levels off without significant decrease. This reaction could be run for example at 110° C. for over 5 hours or at 145° C. for about 1.5 hours.

The remainder of the N-methyl pyrrolidone is then stirred in, and the (exothermic) treatment with the dimethylol propionic acid and triethylamine carried out at a self-maintained 60°-65° C.

B & C. The resulting prepolymer/N-methyl pyrrolidone dispersion in water is then chain extended and end capped, in Example 4 in the same proportions as in Example 1 and in Example 5, by modified proportions, as shown in Table III below which also shows the properties of the products of Examples 4 and 5.

TABLE III

| | Example 4 | Example 5 |
|---|---|---|
| Diethylene Triamine %* | 15 | 30 |
| Ethylene Diamine %* | 40 | 40 |
| Adipic Dihydrazide %* Chain Extender | 15 | 5 |
| Adipic Dihydrazide %* End Capping | 30 | 15 |
| Tensile Strength, psi | 6,000 | 5,500 |
| Tensile at yield, psi | 5,250 | 4,640 |
| 100% modulus, psi** | 5,700 | 5,400 |
| Elongation at Break, % | 95 | 86 |
| Stress-strain Curve Shape | yield | no yield |
| Impact Resistance, inch-lbs. | 160 | 160 |
| MEK Rubs | 150 | 150 |
| Rocker Hardness, RT, 6 hours | 14 | 14 |
| Rocker Hardness, RT, 20 hours | 44 | 42 |
| Pencil Hardness, RT, 30 min. | 6B | 6B |
| Pencil Hardness, RT, 75 min. | 2B | 4B |
| Pencil Hardness, RT, 135 min. | B | F |

*Percent of free NCO in prepolymer
**Measured directly when reached or calculated by extrapolation The water resistance and other properties of the latices as in Examples 4 and 5 are comparable to those of Examples 1-3.

This invention has been disclosed with respect to preferred embodiments and it will be understood that modifications and variations thereof obvious to those skilled in the art are to be included within the spirit and purview of this application and the scope of the appended claims.

The embodiments of the invention in which an exclusive property or privilege is claimed are defined as follows:

1. A stable aqueous dispersion of a room temperature curing polurethane forming films resistant to water and organic solvents, prepared by
   a. dispersing in water an NCO-terminated polyurethane prepolymer containing units derived from melamine in the prepolymer chain and pendant water-dispersing carboxylic salt groups,
   b. chain extending the dispersed prepolymer by mixing into the dispersion an aliphatic polyamine chain extender more reactive with NCO groups than water,
   c. end capping the resulting dispersed polyurethane by mixing into the dispersion an organic dihydrazide, and
   d. reacting the resulting dispersed end capped polyurethane by mixing formaldehyde into the dispersion to convert hydrazide end caps into N-methylol groups; the resulting N-methylol terminated polyurethane containing about 1% to about 5% by weight of units derived from melamine.

2. A dispersion according to claim 1 wherein said N-methylol-terminated polyurethane contains about 0.5% to about 10% by weight of carboxylic acid groups, about 40% to about 100% of which are neutralized as salts with a tertiary amine.

3. A dispersion according to claim 2 wherein said NCO-terminated prepolymer is produced by reacting organic material containing an average of about 2 active hydrogen atoms per molecule, in addition to melamine and a dihydroxyalkanoic acid, with a stoichiometric excess of an organic diisocyanate.

4. A dispersion according to claim 3 wherein said organic material containing an average of about 2 active hydrogen atoms per molecule is an OH-terminated polyester polyol and the reaction to produce the prepolymer is carried out in an organic solvent medium.

5. A dispersion according to claim 4 wherein said organic solvent is water soluble or readily water dispersible and has a boiling point of at least about 145° C.

6. A dispersion according to claim 5 wherein said organic solvent is N-methyl pyrrolidone.

7. A dispersion according to claim 6 wherein said aliphatic polyamine chain extender comprises ethylene diamine, diethylene triamine and organic dihydrazide.

8. A dispersion according to claim 7 wherein about 60% to about 120% of the formaldehyde needed to stoichiometrically react with said hydrazide end caps is employed.

9. A dispersion according to claim 8 wherein the tertiary amine employed for forming the salts of the carboxylic acid groups is triethylamine.

10. A dispersion according to claim 9 wherein said OH-terminated polyester-polyol has a molecular weight of about 400 to about 5,000 and is produced by reacting adipic acid with a stoichiometric excess of a mixture of hexane diol and neopentyl glycol.

11. A dispersion according to claim 10 wherein said dihydroxy alkanoic acid is 2,2-dimethylol propionic acid.

12. A dispersion according to claim 11 wherein said organic diisocyanate is 4,4'-bis(isocyanatocyclohexyl)methane.

13. A dispersion according to claim 12 wherein said organic dihydrazide is adipic dihydrazide.

14. A dispersion according to any one of claims 3 to 13 wherein said NCO-terminated prepolymer is produced by reaction of the dihydroxyalkanoic acid with the intermediate resulting from the previous reaction of the organic diisocyanate with the melamine and organic material containing an average of about 2 active hydrogen atoms per molecule.

15. A method for making a stable aqueous dispersion of a room temperature curing polyurethane forming films resistant to water and organic solvents comprising
   a. dispersing in water a NCO-terminated polyurethane prepolymer containing units derived from melamine in the prepolymer chain and pendant water-dispersing carboxylic salt groups,
   b. chain extending the dispersed prepolymer by mixing into the dispersion an aliphatic polyamine chain extender more reactive with NCO groups than water,
   c. end capping the resulting dispersed polyurethane by mixing into the dispersion an organic dihydrazide, and
   d. reacting the resulting dispersed end capped polyurethane by mixing formaldehyde into the dispersion to convert hydrazide end caps into N-methylol groups; sufficient melamine reactant being employed to provide the N-methylol-terminated polyurethane with about 1% to about 5% by weight of units derived from the melamine in the polymer chain.

16. A method according to claim 15 wherein said NCO-terminated polyurethane prepolymer is produced by reacting melamine, a dihydroxyalkanoic acid and a different organic material containing an average of about 2 active hyrogen atoms per molecule, with a stoichiometric excess of an organic diisocyanate.

17. A method according to claim 16 wherein the dihydroxyalkanoic acid is reacted with the intermediate resulting from the previous reaction of the organic diisocyanate with the melamine and the said organic material contains an average of about 2 active hydrogen atoms per molecule.

18. A method according to claims 16 or 17 wherein said organic material containing an average of about 2 active hydrogen atoms per molecule is a polyester polyol.

* * * * *